United States Patent
Boettcher

(10) Patent No.: US 9,523,627 B2
(45) Date of Patent: Dec. 20, 2016

(54) METHOD FOR DETERMINING SEGMENT TIMES OF A SENSOR WHEEL OF AN INTERNAL COMBUSTION ENGINE

(71) Applicant: Robert Bosch GmbH, Stuttgart (DE)

(72) Inventor: Jens Boettcher, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 14/250,564

(22) Filed: Apr. 11, 2014

(65) Prior Publication Data

US 2014/0311230 A1    Oct. 23, 2014

(30) Foreign Application Priority Data

Apr. 19, 2013  (DE) .................. 10 2013 207 173

(51) Int. Cl.
| | |
|---|---|
| *G01M 15/11* | (2006.01) |
| *G01M 15/06* | (2006.01) |
| *F02D 41/00* | (2006.01) |
| *G01P 3/489* | (2006.01) |
| *F02D 41/14* | (2006.01) |
| *F02D 41/28* | (2006.01) |

(52) U.S. Cl.
CPC .......... *G01M 15/06* (2013.01); *F02D 41/0097* (2013.01); *G01P 3/489* (2013.01); *F02D 2041/1432* (2013.01); *F02D 2041/286* (2013.01); *F02D 2200/1012* (2013.01)

(58) Field of Classification Search
USPC ............................ 73/114.03, 114.04, 114.05, 114.24, 73/114.25, 114.26, 114.27
See application file for complete search history.

(56) References Cited

U.S. PATENT DOCUMENTS

| | | | | |
|---|---|---|---|---|
| 5,428,991 A | * | 7/1995 | Klenk et al. ................ | 73/114.26 |
| 5,481,909 A | * | 1/1996 | Deutsch ................. | G01M 15/11 123/436 |
| 5,691,469 A | * | 11/1997 | Mezger et al. ............ | 73/114.03 |
| 5,747,679 A | * | 5/1998 | Dietz et al. ................. | 73/114.03 |
| 5,841,025 A | * | 11/1998 | Remboski .............. | G01M 15/11 73/114.05 |
| 5,862,506 A | * | 1/1999 | Lynch ................. | F02D 41/1498 701/101 |
| 5,893,042 A | * | 4/1999 | Lohmann et al. ............ | 701/111 |
| 6,101,993 A | * | 8/2000 | Lewis ....................... | F01L 1/34 123/90.17 |
| 6,314,802 B1 | * | 11/2001 | Wu et al. .................... | 73/114.04 |
| 6,439,198 B2 | * | 8/2002 | Lehner et al. ................ | 123/436 |

(Continued)

*Primary Examiner* — Eric S McCall
(74) *Attorney, Agent, or Firm* — Norton Rose Fulbright US LLP; Gerard Messina

(57) ABSTRACT

A method for determining segment times of a sensor wheel of an internal combustion engine, the sensor wheel being non-rotatably connected to a crankshaft of the internal combustion engine, marks being situated along the circumference of the sensor wheel, and the crankshaft of the internal combustion engine covering predetermined angle ranges during the segment times. Tooth times are determined as time intervals between two marks of the sensor wheel; a low-pass filtering is applied to the determined tooth times, and filtered tooth times are determined as a result of the low-pass filtering. Segment times of the sensor wheel are determined as a sum of filtered tooth times of a certain number of successive marks of the sensor wheel.

11 Claims, 2 Drawing Sheets

(56) References Cited

U.S. PATENT DOCUMENTS

| | | | | |
|---|---|---|---|---|
| 6,978,666 B1* | 12/2005 | Wu | ........................ | G01M 15/11 73/114.02 |
| 2006/0101902 A1* | 5/2006 | Christensen | .................... | 73/116 |
| 2007/0256482 A1* | 11/2007 | Sheikh | .................. | G01M 15/06 73/114.26 |

* cited by examiner

METHOD FOR DETERMINING SEGMENT TIMES OF A SENSOR WHEEL OF AN INTERNAL COMBUSTION ENGINE

RELATED APPLICATION INFORMATION

The present application claims priority to and the benefit of German patent application no. 10 2013 207 173.6, which was filed in Germany on Apr. 19, 2013, the disclosure of which is incorporated herein by reference.

FIELD OF THE INVENTION

The present invention relates to a method for determining segment times of a sensor wheel of an internal combustion engine.

BACKGROUND INFORMATION

Misfires of an internal combustion engine result in an increase in pollutants emitted during operation of the engine and may also result in damage to the catalytic converter in the exhaust system of the internal combustion engine. To meet statutory requirements for monitoring functions relevant to the exhaust gas, it is necessary to detect misfires in the entire rotational speed range and load range. In this context, it is possible that during operation with misfires, characteristic changes occur in the rotational speed characteristic of the internal combustion engine in comparison with normal operation without misfires. By comparing these rotational speed characteristics, it is possible to differentiate between normal operation without misfires and operation with misfires.

Therefore, a crankshaft angle range, which is referred to as a segment, may be assigned to a certain range of the piston movement of each cylinder. These segments may be implemented, for example, by marks on a sensor wheel, which is coupled to the crankshaft. The segment time during which the crankshaft passes over this angle range depends on the energy converted in the combustion cycle, among other things. Misfires result in an increase in segment times detected in synchronization with firing. Differences in segment times thus constitute a measure for the unsteady running of an internal combustion engine.

The marks on the sensor wheel are subject to mechanical tolerances, referred to below as tooth defects, with respect to their defined position, so that measured segment times may be falsified. These tooth defects may be ascertained and corrected through suitable algorithms as part of a tooth defect adaption. For this tooth defect adaption, the internal combustion engine is operated in a defined engine condition, which is associated with a great effort and cannot be implemented during normal operation of the internal combustion engine in particular. Therefore, there may be long periods of time without a tooth time adaption and thus without a tooth defect correction, during which certain segment times may be falsified.

The object now confronting those skilled in the art is to provide a possibility for determining segment times of a sensor wheel of an internal combustion engine by a simple method and thereby compensate for mechanical tolerances in the marks on the sensor wheel.

SUMMARY OF THE INVENTION

A method for determining segment times of sensor wheel of an internal combustion engine having the features described herein is provided according to the present invention. Advantageous embodiments are the subject matter of the subclaims as well as the following description.

The method according to the present invention presents a possibility which is simple to implement for determining segment times of a sensor wheel and to thereby compensate for mechanical tolerances in the marks on the sensor wheel. Components and parts of the internal combustion engine which are already present may be utilized and it is not necessary to make changes in or modifications of the internal combustion engine.

The sensor wheel is non-rotatably connected to a crankshaft of the internal combustion engine. Alternatively or additionally, the sensor wheel may also be non-rotatably connected to a camshaft of the internal combustion engine. Along the circumference of the sensor wheel, the marks are spaced essentially equidistantly in particular. Tooth times are determined as the time intervals between two marks on the sensor wheel.

The marks on the sensor wheel are scanned by a pickup sensor, for example a magnetic sensor, and a measuring signal, for example, an electric voltage signal, is determined. The points in time when a mark passes by the pickup sensor may be determined as tooth times from this continuous analog measuring signal. A digital tooth time signal is determined in this way as a series of tooth times belonging to the individual marks.

These tooth times may be falsified due to the mechanical tolerances in the marks on the sensor wheels. The present invention is based on the finding that the deviations from a defined position of the marks on the sensor wheel due to mechanical tolerances may be assumed to have a normal distribution in first approximation. An average deviation of the marks from the defined position over an advantageously large segment of the sensor wheel therefore converges toward zero. Traditional statistical averaging of the tooth times of the marks would compensate for the mean deviation, but the absolute deviations in the individual marks would nevertheless be retained and would further falsify the segment times.

According to the present invention, low-pass filtering is used for the individual tooth times determined or for the tooth time signal. This low-pass filtering may be compared with the formation of a sliding mean value. Filtered tooth times are determined as a result of this low-pass filtering. Deviations of the individual marks from defined positions are thus effectively filtered out. Segment times of the sensor wheel are determined as the sum of these filtered tooth times of a certain number of successive marks on the sensor wheel.

The segment time of an advantageously large segment is thus approximately unfalsified and free of tooth defects. For an internal combustion engine having four cylinders, for example, a segment of 180° may be regarded as large enough. It is thus no longer necessary to carry out a tooth defect adaption. For the method according to the present invention, it is not necessary to operate the internal combustion engine in a specific operating mode or a defined engine condition. The method according to the present invention may be carried out during regular operation of the internal combustion engine and integrated into the control unit of the internal combustion engine. The segment time determination according to the present invention may thus be used for a wide variety of functions of the internal combustion engine, for example, for an accurate determination of the rotational speed of the internal combustion engine or for regulation of the camshaft movement.

A cut-off frequency for the low-pass filtering may be selected in such a way that a firing frequency and lower frequencies of the internal combustion engine are attenuated by a let-through value at most, for example, by 10% at most. Alternatively or additionally, the cut-off frequency may be selected in such a way that twice the firing frequency and higher frequencies of the internal combustion engine are attenuated at least by a damping value, i.e., by at least 90%, for example. The steepness of the filter characteristic line, the let-through value and the attenuation value are advantageously predefined as a function of the corresponding intended purpose. As a result, only frequency components attributable to the combustion process enter into the segment time calculation. This prevents aliasing effects. Thus a certain filter quality of the low-pass filtering is achieved due to the advantageous choice of the cut-off frequency.

A firing frequency usually describes a number of firing events per unit of time. A firing frequency f in $[s^{-1}]$ may be calculated for a four-cycle engine from a rotational speed n in $[min^{-1}]$ and a cylinder number N of $(n/60)*(N/2)$. The firing frequency acts as a sample frequency for the filtering. Since the cut-off frequency relates to the sample frequency but changes only with the rotational speed, it is advantageous to use the standardized frequency $\omega=2\pi f$. In order not to violate the sampling criterion, the standardized frequency relates to a range of $0 \ldots \pi$.

In one advantageous embodiment of the present invention, the low-pass filter is an FIR filter (finite impulse response filter), in particular a sliding mean filter. The filtered tooth times as the result of the FIR filter are determined from a finite recent past of the tooth time signal. In the case of FIR filters and sliding mean filters, a total of "n" successive tooth times (weighted differently, if necessary) is formed and then divided by "n." The group of n values is then advanced further continuously by one clock pulse each, and the mean value is formed again each time. The result is a sequence of filtered tooth times which have passed through a low-pass filter.

Monitoring of the unsteady running of the internal combustion engine may be carried out with the aid of the determined segment times. In contrast with the tooth defect adaption, the method according to the present invention for segment time determination is also able to determine unfalsified values for the segment times easily during ongoing operation of the internal combustion engine. The present invention is thus suitable in particular for permanent real-time monitoring of the unsteady running of the internal combustion engine.

Rotational speed gradients may be determined as differences in successive segment times. Since misfires of individual cylinders of the internal combustion engine result in an increase in the segment times detected in synchronization with firing, and since the differences in segment times constitute a measure for the unsteady running of the internal combustion engine, the rotational speed gradients from the segment times determined according to the present invention are offered in particular for monitoring the unsteady running of the internal combustion engine. It is possible in particular to monitor whether the rotational speed gradients reach a predefined threshold value.

A misfire of the internal combustion engine may be detected when the rotational speed gradients reach the predefined threshold value. A user, for example, a driver of a motor vehicle, may be informed about misfires in this case by a warning light, for example. In addition, information about the incidence and the details of circumstances of the misfires may be stored to be available for subsequent maintenance or repair jobs.

A computation unit according to the present invention, for example, a control unit of a motor vehicle, is configured to carry out a method according to the present invention, in particular with respect to programming.

The implementation of this method in the form of software is advantageous since this causes particularly low costs, in particular when an executing control unit is also used for other tasks and is therefore present anyway. Suitable data media for supplying the computer program include in particular diskettes, hard drives, flash memories, EEPROMs, CD-ROMs, DVDs, etc. It is also possible to download a program via computer networks (Internet, Intranet, etc.).

Additional advantages and embodiments of the present invention are derived from the description and the accompanying drawings.

It is understood that the features described above and those yet to be explained below may be used not only in the particular combination indicated here but also in other combinations or alone without departing from the scope of the present invention.

The present invention is schematically depicted in the drawings on the basis of exemplary embodiments and described in greater detail below with reference to the drawings.

DETAILED DESCRIPTION

Figure 1:
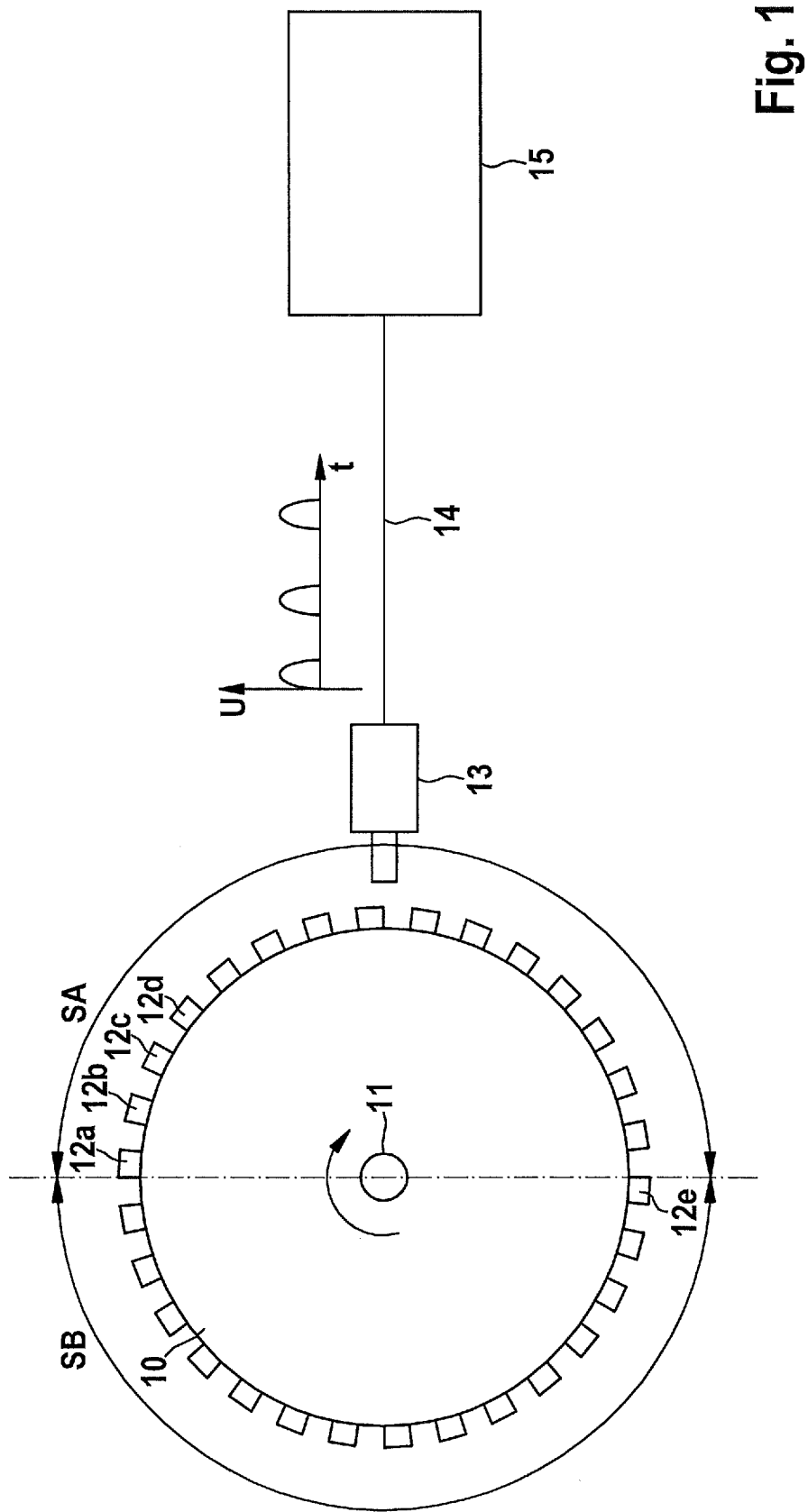
FIG. 1 schematically shows a configuration which is configured for carrying out a specific embodiment of a method according to the present invention.

FIG. 1 schematically shows a configuration which is configured for carrying out a specific embodiment of a method according to the present invention.

A sensor wheel 10 is non-rotatably connected to a crankshaft 11 of an internal combustion engine (not shown in FIG. 1) of a motor vehicle. The circumference or the edge of sensor wheel 10 has marks 12a, 12b, 12c, 12d . . . . For example, sensor wheels having 60-2 teeth are widely used, the marks being arranged at a spacing of 6° each.

Sensor wheel 10 may be divided into multiple essentially equidistant segments. In the specific example in FIG. 1, sensor wheel 10 is divided into two segments SA and SB, each having 180° between mark 12a and mark 12e.

For example, a segment SA or SB of an internal combustion engine having four cylinders corresponds to a crankshaft movement by 180° and a piston stroke of a piston of the internal combustion engine. A piston stroke is to be understood as the movement of the piston between top dead center TDC and bottom dead center BDC.

A pickup sensor is configured as a Hall sensor 13. Hall sensor 13 is set up in the vicinity of the edge of sensor wheel 10 and is connected to a line 14 leading to a control unit 15 of the internal combustion engine. Control unit 15 is configured to carry out a specific embodiment of a method according to the present invention.

Crankshaft 11 and thus also sensor wheel 10 rotate during operation of the internal combustion engine. The start of each mark creates a voltage pulse in pickup sensor 13. A corresponding voltage signal is schematically shown as diagram U(t) in FIG. 1.

Figure 2:
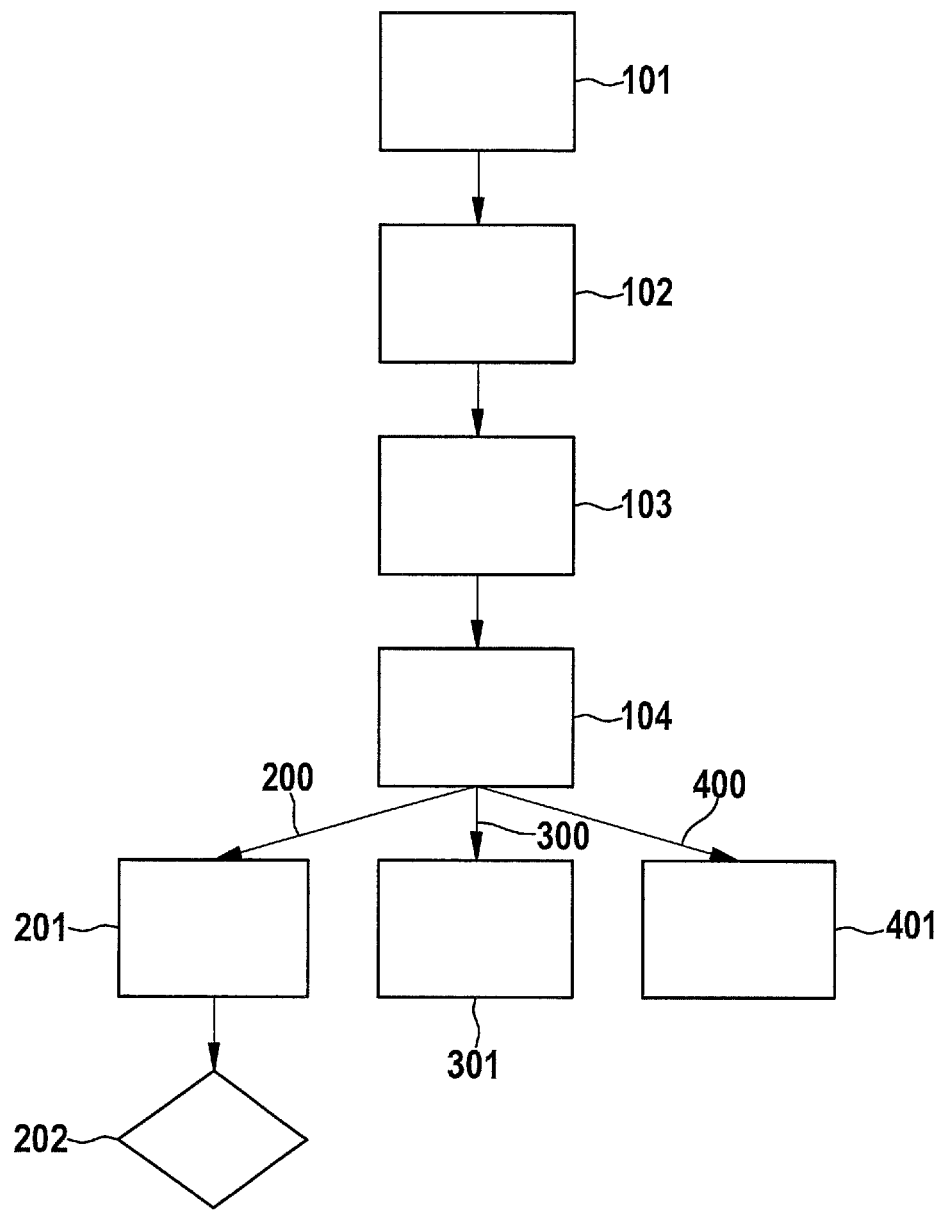
FIG. 2 schematically shows a specific embodiment of a method according to the present invention as a block diagram.

Control unit 15 evaluates voltage signal U(t) and carries out a specific embodiment of a method according to the present invention, which is explained with reference to FIG. 2. A specific embodiment of a method according to the present invention is schematically shown as a block diagram in FIG. 2.

A voltage signal is detected by pickup sensor 13 in step 101, as explained above. The voltage signal is evaluated in step 102. The points in time at which the voltage pulse belonging to the corresponding mark is detected are determined from the individual voltage pulses. The time intervals between these points in time are determined as tooth times. A digital tooth time signal is thus determined as a series of tooth times belonging to the individual marks.

Low-pass filtering is used on the tooth time signal in step 103, i.e., on the determined tooth times. In this specific example, FIR filtering is applied to the tooth times. Filtered tooth times $t_{filter}$ are calculated from tooth times $t_{tooth}$ determined according to the following equation:

$$t_{filter}(x) = \sum_{i=0}^{N} \left\{ C(i) * t_{tooth}\left(x - \frac{N}{2} + i\right) \right\}$$

where N is the order of the FIR filtering, and C(i) refers to the coefficients of FIR filtering, which are necessarily determined by those skilled in the art with the aid of mathematical software tools, for example. The filter algorithm is calculated for each individual tooth time $t_{tooth}$.

In step 104, segment times $t_{segment}$ are calculated from determined filtered tooth times $t_{filter}$. For example, the following holds for a segment SA or SB, which characterizes a piston stroke between top dead center of a piston (start of segment A) and bottom dead center of the piston (end of segment B):

$$t_{segment}(y) = \sum_{i=A}^{B} \{t_{filter}(x - A + i)\}$$

Segment times $t_{segment}$ determined in this way may be used for a wide variety of functions of the internal combustion engine, represented by reference numerals 200, 300 or 400 as an example.

In case 200, the segment times are used to monitor an unsteady running of the internal combustion engine. Rotational speed gradients are determined as differences in successive segment times $t_{segment}$ in step 201. In step 202, a check is made of whether the rotational speed gradients reach a predefined threshold value, in particular whether they go below the threshold. If this is the case, then a misfire of the internal combustion engine is detected.

In step 301, segment times $t_{segment}$ are used for determining the rotational speed of the internal combustion engine. In step 401, segment times $t_{segment}$ are used for regulating a camshaft movement of the internal combustion engine.

What is claimed is:

1. A method for determining a segment time of a sensor wheel of an internal combustion engine, the method comprising:

determining tooth times as time intervals between two marks of the sensor wheel, the sensor wheel being non-rotatably connected to a crankshaft of the internal combustion engine, the marks being situated along the circumference of the sensor wheel, and the crankshaft of the internal combustion engine covering predetermined angle ranges during the segment times;

low-pass filtering the determined tooth times, and determining filtered tooth times as a result of the low-pass filtering; and determining segment times of the sensor wheel as a sum of filtered tooth times of a certain number of successive marks of the sensor wheel.

2. The method of claim 1, wherein the low-pass filter is an FIR filter.

3. The method of claim 1, wherein the low-pass filter is a sliding mean filter.

4. The method of claim 1, wherein steady running of the internal combustion engine is monitored with the aid of the determined segment times.

5. The method of claim 1, wherein rotational speed gradients are determined as differences of successive segment times, and a check is made of whether the rotational speed gradients reach a predefined threshold value.

6. The method of claim 5, wherein a misfire of the internal combustion engine is detected when the rotational speed gradient reaches the predefined threshold value.

7. A method for determining a segment time of a sensor wheel of an internal combustion engine, the method comprising:

determining tooth times as time intervals between two marks of the sensor wheel, the sensor wheel being non-rotatably connected to a crankshaft of the internal combustion engine, the marks being situated along the circumference of the sensor wheel, and the crankshaft of the internal combustion engine covering predetermined angle ranges during the segment times;

low-pass filtering the determined tooth times, and determining filtered tooth times as a result of the low-pass filtering; and determining segment times of the sensor wheel as a sum of filtered tooth times of a certain number of successive marks of the sensor wheel, wherein a cut-off frequency of the low-pass filter is selected so that a firing frequency and lower frequencies of the internal combustion engine are attenuated by a most a let-through value.

8. A method for determining a segment time of a sensor wheel of an internal combustion engine, the method comprising:

determining tooth times as time intervals between two marks of the sensor wheel, the sensor wheel being non-rotatably connected to a crankshaft of the internal combustion engine, the marks being situated along the circumference of the sensor wheel, and the crankshaft of the internal combustion engine covering predetermined angle ranges during the segment times;

low-pass filtering the determined tooth times, and determining filtered tooth times as a result of the low-pass filtering; and determining segment times of the sensor wheel as a sum of filtered tooth times of a certain number of successive marks of the sensor wheel, wherein a cut-off frequency of the low-pass filter is selected so that twice the firing frequency and higher frequencies of the internal combustion engine are attenuated by at least one damping value.

9. A computer unit, comprising:
a processor arrangement for determining a segment time of a sensor wheel of an internal combustion engine, the processor arrangement being configured to perform the following:
   determining tooth times as time intervals between two marks of the sensor wheel, the sensor wheel being non-rotatably connected to a crankshaft of the internal combustion engine, the marks being situated along the circumference of the sensor wheel, and the crankshaft of the internal combustion engine covering predetermined angle ranges during the segment times;
   low-pass filtering the determined tooth times, and determining filtered tooth times as a result of the low-pass filtering; and
   determining segment times of the sensor wheel as a sum of filtered tooth times of a certain number of successive marks of the sensor wheel.

10. A computer readable medium having a computer program, which is executable by a processor, comprising:
a program code arrangement having program code for determining a segment time of a sensor wheel of an internal combustion engine, by performing the following:
   determining tooth times as time intervals between two marks of the sensor wheel, the sensor wheel being non-rotatably connected to a crankshaft of the internal combustion engine, the marks being situated along the circumference of the sensor wheel, and the crankshaft of the internal combustion engine covering predetermined angle ranges during the segment times;
   low-pass filtering the determined tooth times, and determining filtered tooth times as a result of the low-pass filtering; and
   determining segment times of the sensor wheel as a sum of filtered tooth times of a certain number of successive marks of the sensor wheel.

11. A computer readable medium having a computer program, which is executable by a processor, comprising:
a program code arrangement having program code for determining a segment time of a sensor wheel of an internal combustion engine, by performing the following:
   determining tooth times as time intervals between two marks of the sensor wheel, the sensor wheel being non-rotatably connected to a crankshaft of the internal combustion engine, the marks being situated along the circumference of the sensor wheel, and the crankshaft of the internal combustion engine covering predetermined angle ranges during the segment times;
   low-pass filtering the determined tooth times, and determining filtered tooth times as a result of the low-pass filtering; and
   determining segment times of the sensor wheel as a sum of filtered tooth times of a certain number of successive marks of the sensor wheel, wherein a cut-off frequency of the low-pass filter is selected so that a firing frequency and lower frequencies of the internal combustion engine are attenuated by at most a leg-through value.

* * * * *